(12) United States Patent
Kajiura

(10) Patent No.: US 6,459,234 B2
(45) Date of Patent: Oct. 1, 2002

(54) CHARGER HAVING SECURED POWER SUPPLIER AND CABLE

(75) Inventor: Katsuyuki Kajiura, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/727,203

(22) Filed: Nov. 30, 2000

(30) Foreign Application Priority Data

Dec. 8, 1999 (JP) ............................................. 11-349191

(51) Int. Cl.⁷ ............................................. H01M 10/46
(52) U.S. Cl. ..................................................... 320/109
(58) Field of Search ................................ 320/104, 108, 320/109; 323/328, 347

(56) References Cited

U.S. PATENT DOCUMENTS

| | | | | |
|---|---|---|---|---|
| 5,306,999 A | * | 4/1994 | Hoffman | 320/109 |
| 5,323,099 A | * | 6/1994 | Bruni et al. | 320/109 X |
| 5,341,083 A | * | 8/1994 | Klontz et al. | 320/109 |
| 5,461,299 A | * | 10/1995 | Bruni | 320/109 X |
| 5,548,200 A | * | 8/1996 | Nor et al. | 320/109 |

FOREIGN PATENT DOCUMENTS

JP 10-117405 5/1998

* cited by examiner

Primary Examiner—Edward H. Tso
(74) Attorney, Agent, or Firm—Woodcock Washburn LLP

(57) ABSTRACT

A power supply paddle of a charger is provided at one end of a cable extending from a power source apparatus. A paddle holder casing which receives and holds therein the power supply paddle is obliquely provided on one side wall of a housing of the power source apparatus, so that an opening of the paddle holder casing is oriented slightly upwardly from the horizontal direction. The power supply paddle is received and held in the paddle holder casing when it is not being used.

12 Claims, 7 Drawing Sheets

CHARGER HAVING SECURED POWER SUPPLIER AND CABLE

BACKGROUND OF THE INVENTION

1. Field of the Invention

The present invention relates to a charger and, in particular, it relates to a charger for use with an electric vehicle.

2. Description of the Related Art

In recent years, an electric vehicle has received attention as a low-pollution car. In such an electric vehicle, it has been desired that a charger, which is indispensable to the electric vehicle, can be easily or conveniently handled. As a charger for an electric vehicle, an induction type charger has come to public notice, since it can be made small and failures of electrical connection tend not to occur.

FIG. 6 shows an induction type charger 50, in which a power source apparatus 51 is provided on a pedestal 52 standing on the ground. The power source apparatus 51 is provided with a power supply paddle 53 electrically connected thereto by a cable 54. The length of the cable 54 is determined in accordance with the distance between the power source apparatus 51 and the electric vehicle 55 and is in general in the range of 3 to 5 meters.

The power supply paddle 53 is held by the power source apparatus 51 when it is not in use. In more detail, the power supply paddle 53 is inserted in a cover 57 attached to the right side of the housing 56 of the power source apparatus 51 through an opening 58 of the cover 57 and is received in a paddle holder casing 59 secured to the right side wall of the housing 56 covered by the cover 57, as shown in FIG. 7. In use, the power supply paddle 53 is removed from the paddle holder casing 59 and is connected to a charge port 60 provided in the electric vehicle 55.

The power supply paddle 53 is received in the paddle holder casing 59 when it is not used, so that the power supply paddle 53 lies in a plane in the insertion direction thereof. Consequently, if external force, such as tensile force is accidentally applied to the cable 54, there is a fear that the power supply paddle 53 is easily detached or removed from the paddle holder casing 59 and is dropped onto the ground and damaged.

Moreover, the power source apparatus 51 provided on the pedestal 52 is 1 to 1.3 m high from the ground. Therefore, when the power supply paddle 53 is received in the paddle holder casing 59, the cable 54 whose length is 3 to 5 m is in contact with the ground surface, as shown in FIG. 6. Consequently, the cable 54 is rubbed against the ground surface and is worn.

SUMMARY OF THE INVENTION

The present invention is aimed at elimination of the drawbacks of the prior art, mentioned above, by providing a charger in which a power supply paddle can be certainly received and held.

Another object of the present invention is to provide a charger in which a cable extending from the power supply paddle can be handled without being damaged. According to an aspect of the present invention, there is provided a charger in which a power supplier provided at one end of a cable extending from a power source apparatus installed on the ground is received and held in a paddle holder casing provided on the power source apparatus when the charger is not used, said power supplier being connected to a power receiver on a power receiving side in a noncontacting fashion to effect charging by electromagnetic induction, wherein said paddle holder casing is obliquely arranged on one side wall of the power source apparatus.

According to the present invention, when the power supplier is not used, and the power supplier is inserted and held in the paddle holder casing, the power supplier cannot be easily detached from the paddle holder casing or dropped onto the ground, even if external force such as tensile force is accidentally exerted on the cable. Thus, the power supplier can be certainly held by the paddle holder casing.

The present invention will be more easily understood from the description of the preferred embodiments of the invention set forth below together with the accompanying drawings.

DESCRIPTION OF THE PREFERRED EMBODIMENTS

The invention will be discussed below with reference to FIGS. 1 through 5 of the drawings which show an embodiment of the present invention applied to a charging system for use with an electric vehicle.

Figure 2:
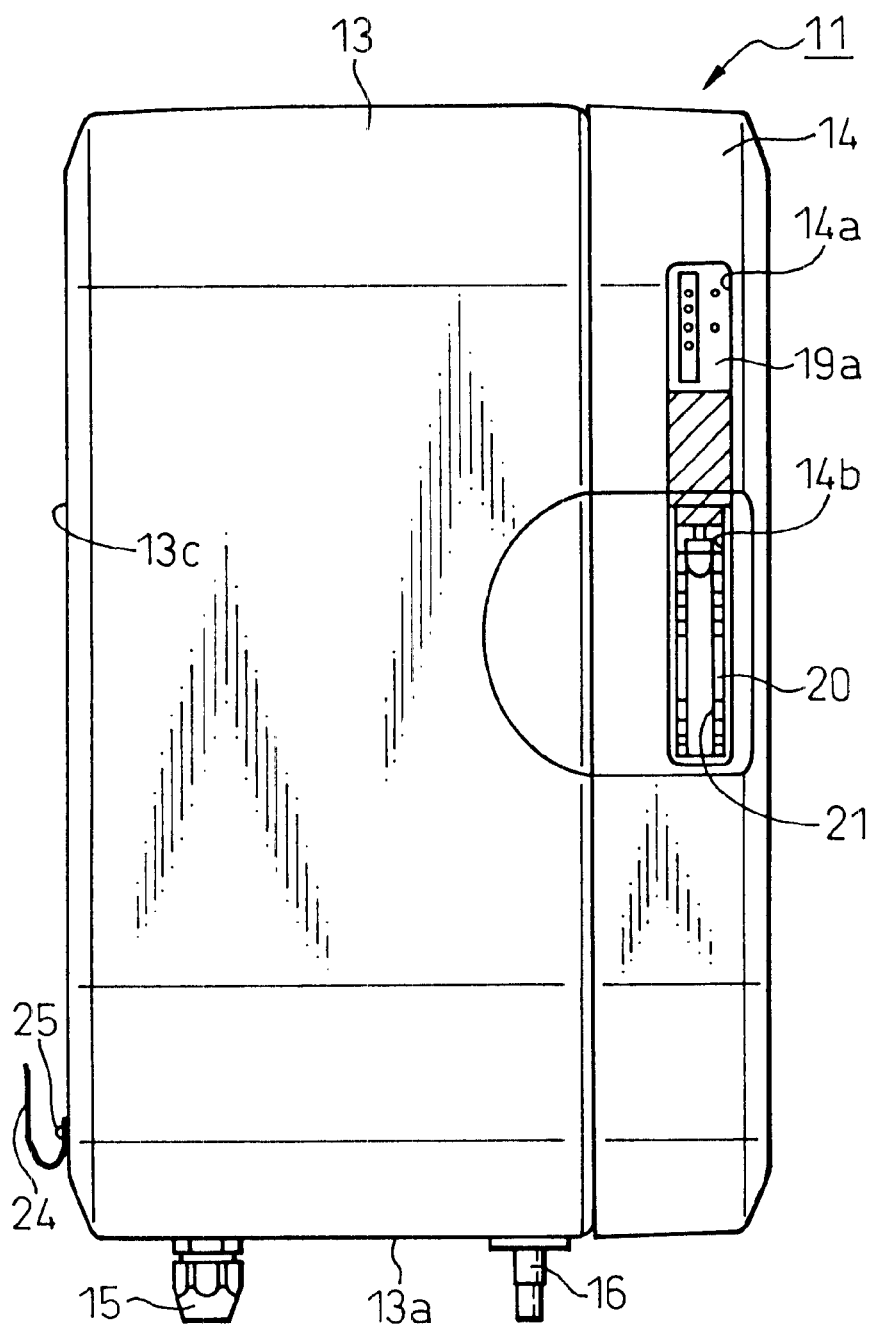
FIG. 2 is a front elevational view of a power source apparatus according to an embodiment of the present invention.

In the illustrated embodiment, a power source apparatus 11 of a charger 10 is provided on a pedestal 12 standing on the ground surface. The power source apparatus 11 is comprised of a housing 13 and a cover 14, attached to one side of the housing 13, as shown in FIGS. 2 and 3.

Figure 3:
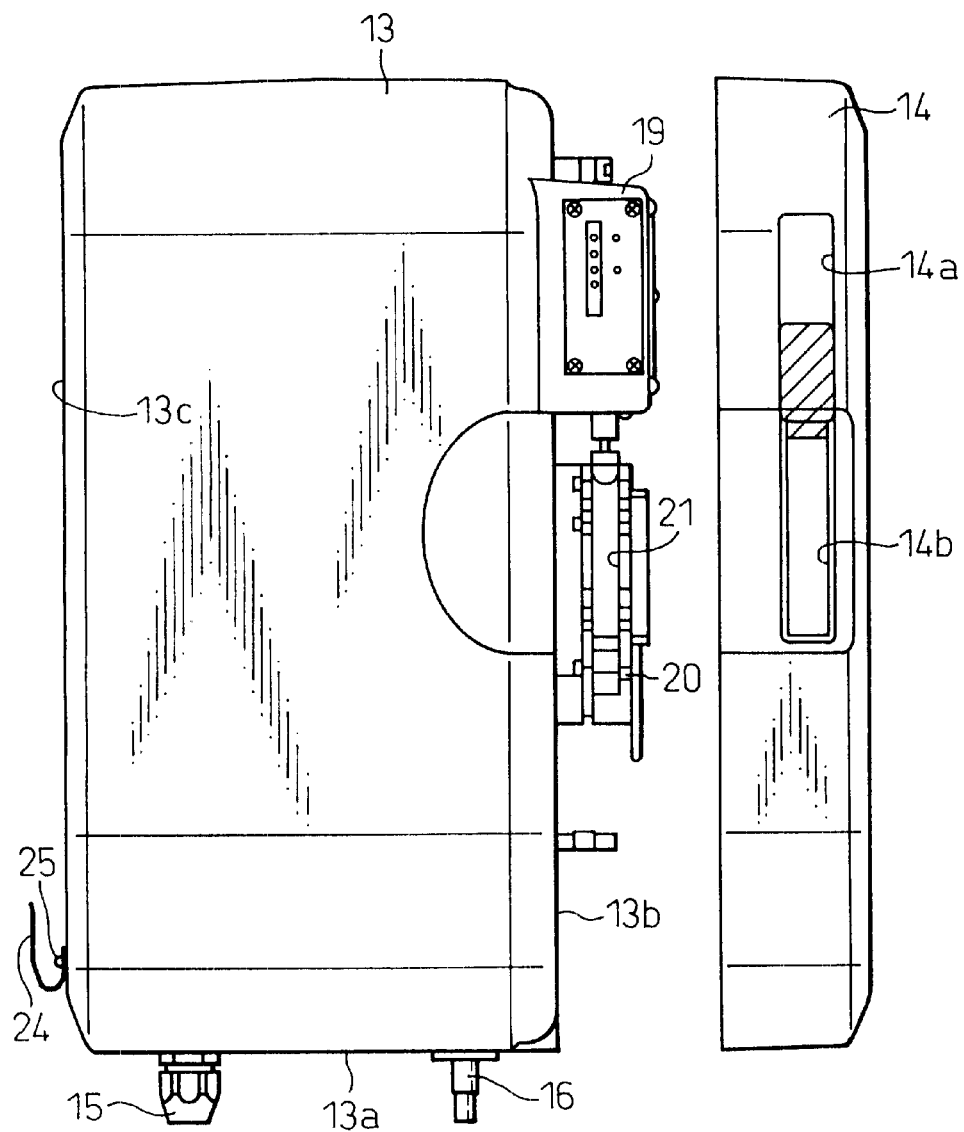
FIG. 3 is an exploded front elevational view of power source apparatus according to an embodiment of the present invention.
Figure 5:
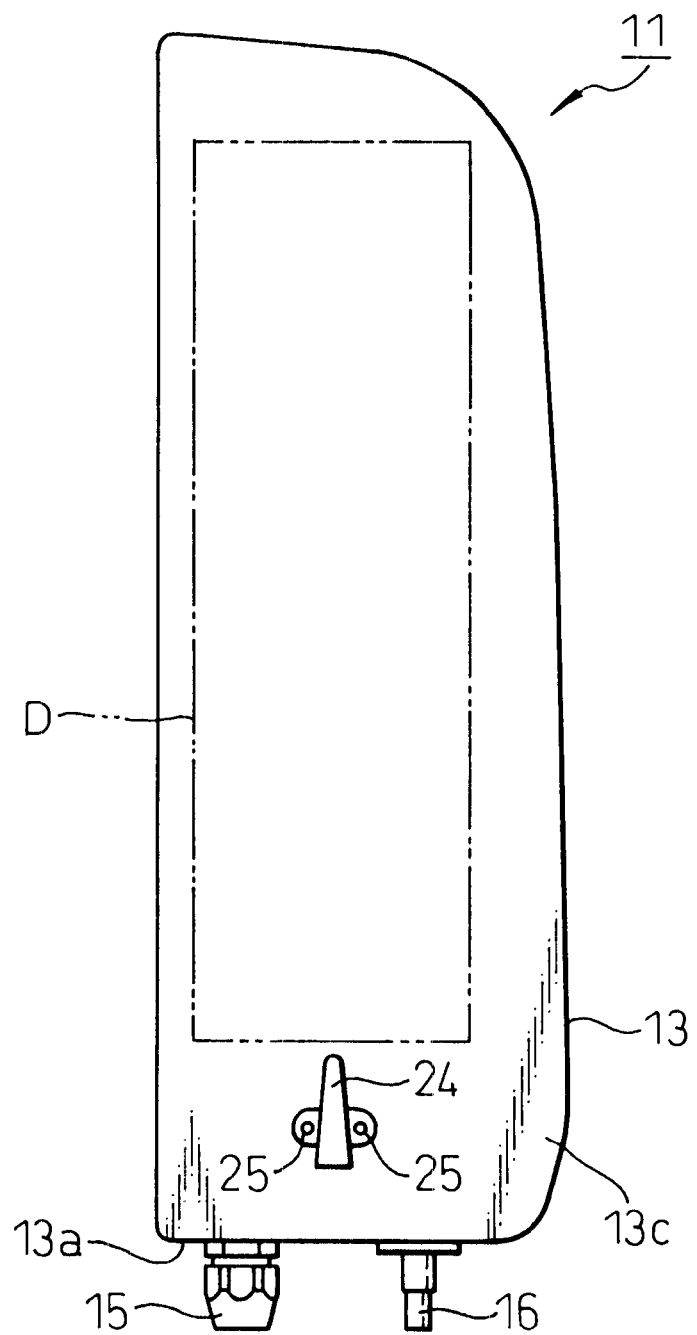
FIG. 5 is a side view of a power source apparatus according to an embodiment of the present invention.
Figure 6:
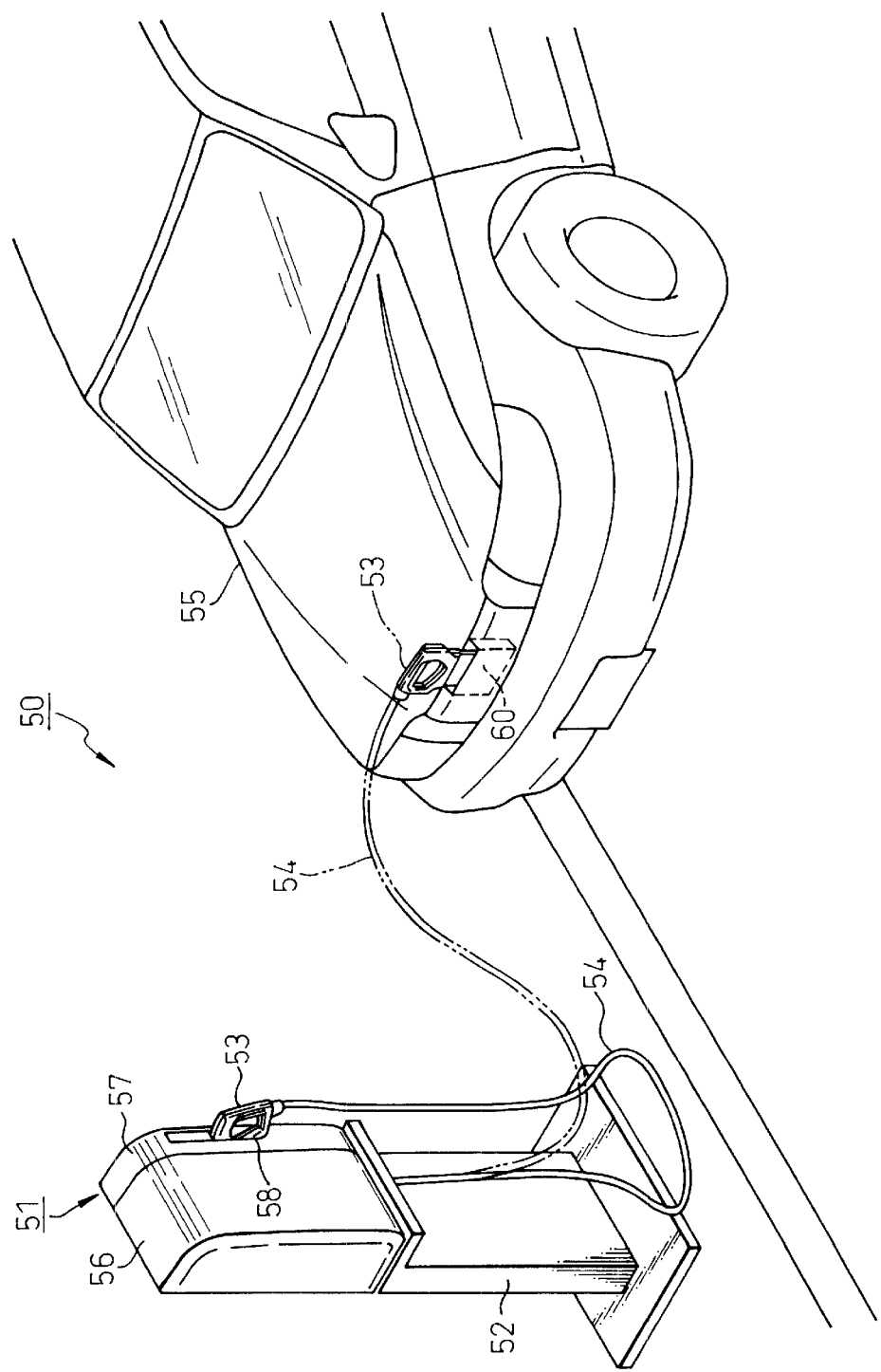
FIG. 6 is a perspective view of a known charger which is used to charge an electric vehicle.
Figure 7:
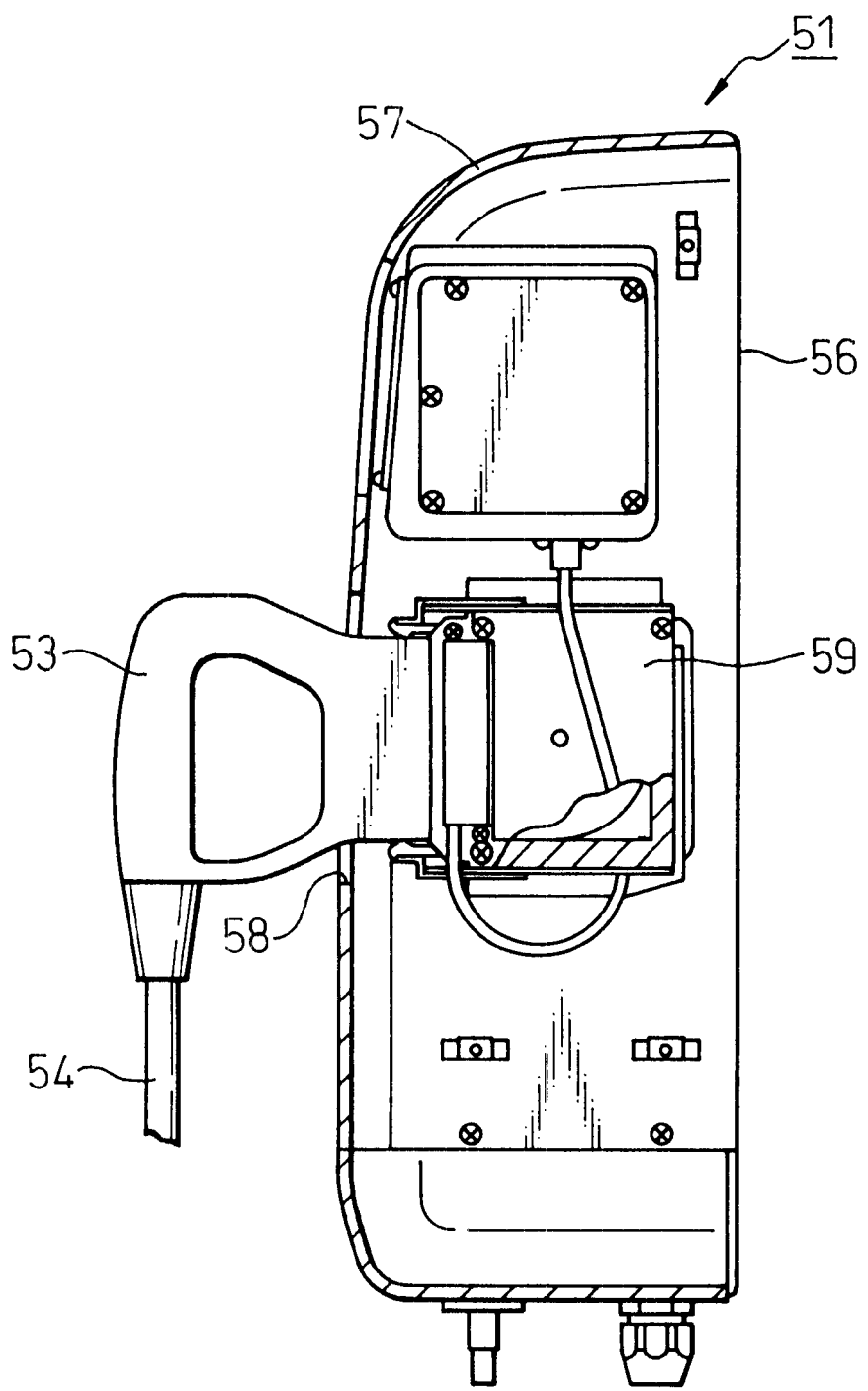
FIG. 7 is a sectional side view of a known power source apparatus.

The housing 13 is provided on its bottom surface 13a with a power source port 15 and an output port 16, as shown in FIGS. 3 and 5. The power source apparatus 11 is connected to an external power source (not shown) by through the power source port 15. The output port 16 on the bottom surface 13a of the housing 13 is adjacent to the cover 14 attached to the housing 13 and is connected to the cable 17 shown in FIG. 1. The cable 17 is provided on its front end with a power supply paddle 18 as a power supplier.

Figure 4:
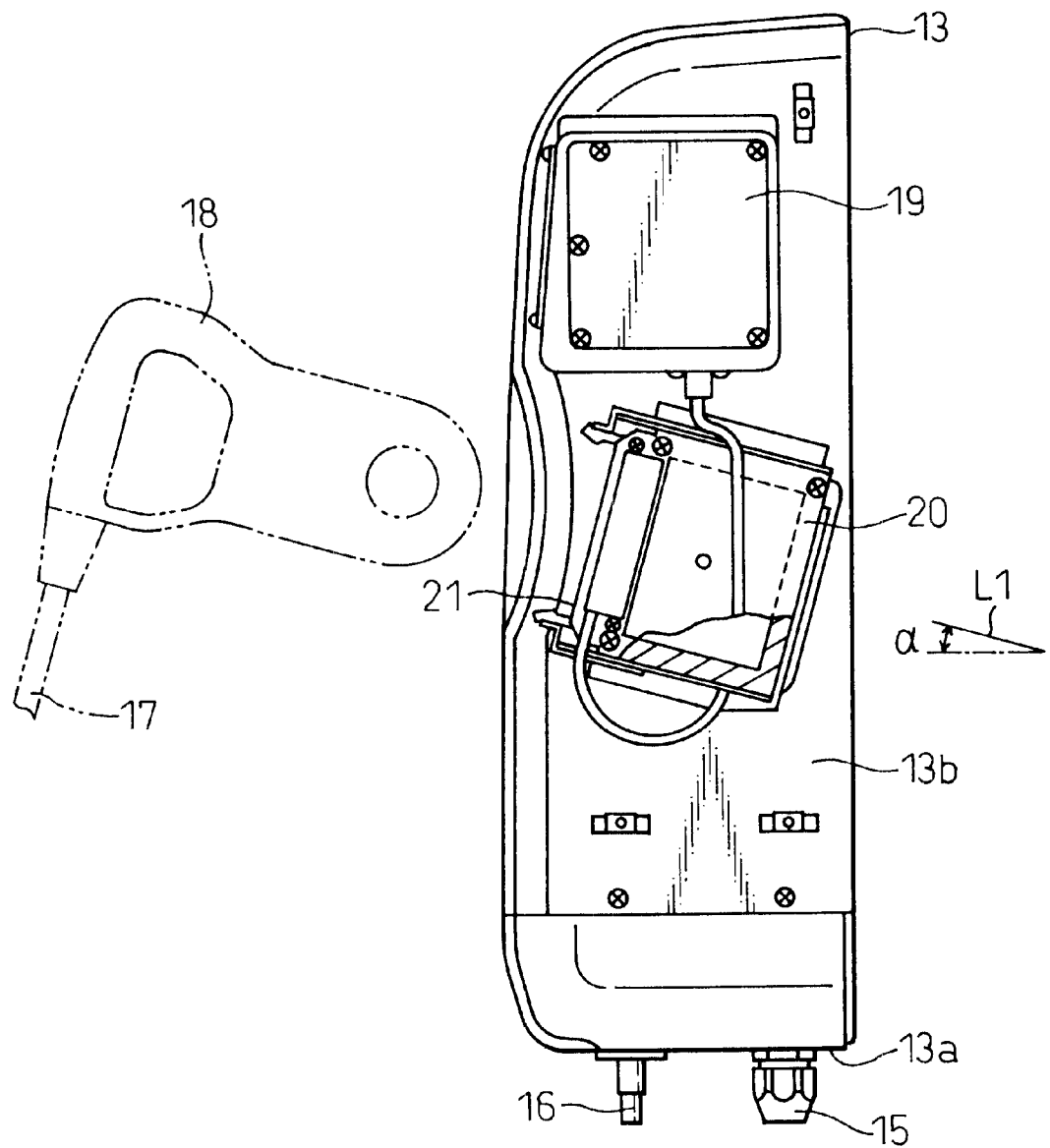
FIG. 4 is an exploded side view of a power source apparatus according to an embodiment of the present invention.

As can be seen in FIGS. 3 and 4, an LED substrate assembly 19 and a paddle holder casing 20 for receiving and holding the power supply paddle 18 are secured to the side wall (right side wall in FIG. 3) 13b of the housing 13.

The paddle holder casing 20 is inclined on the side wall 13b of the housing 13 so that the opening 21 thereof is oriented slightly upward, as shown in FIG. 4. In detail, the paddle holder casing 20 is arranged so that the direction L1 of the opening 21 is slightly inclined at a predetermined inclination angle α in the clockwise direction with respect to the horizontal direction parallel with the ground surface. The angle α is preferably in the range of $15°<α<60°$.

The cover 14 attached to the housing 13 is provided with through holes 14a and 14b (FIGS. 2 and 3), so that when the cover 14 is secured to the housing 13 by means of a securing means (not shown), the indication surface 19a of the LED substrate assembly 19 is exposed through the through hole 14a and the opening 21 of the paddle holder casing 20 is opposed to the through hole 14b.

Figure 1:
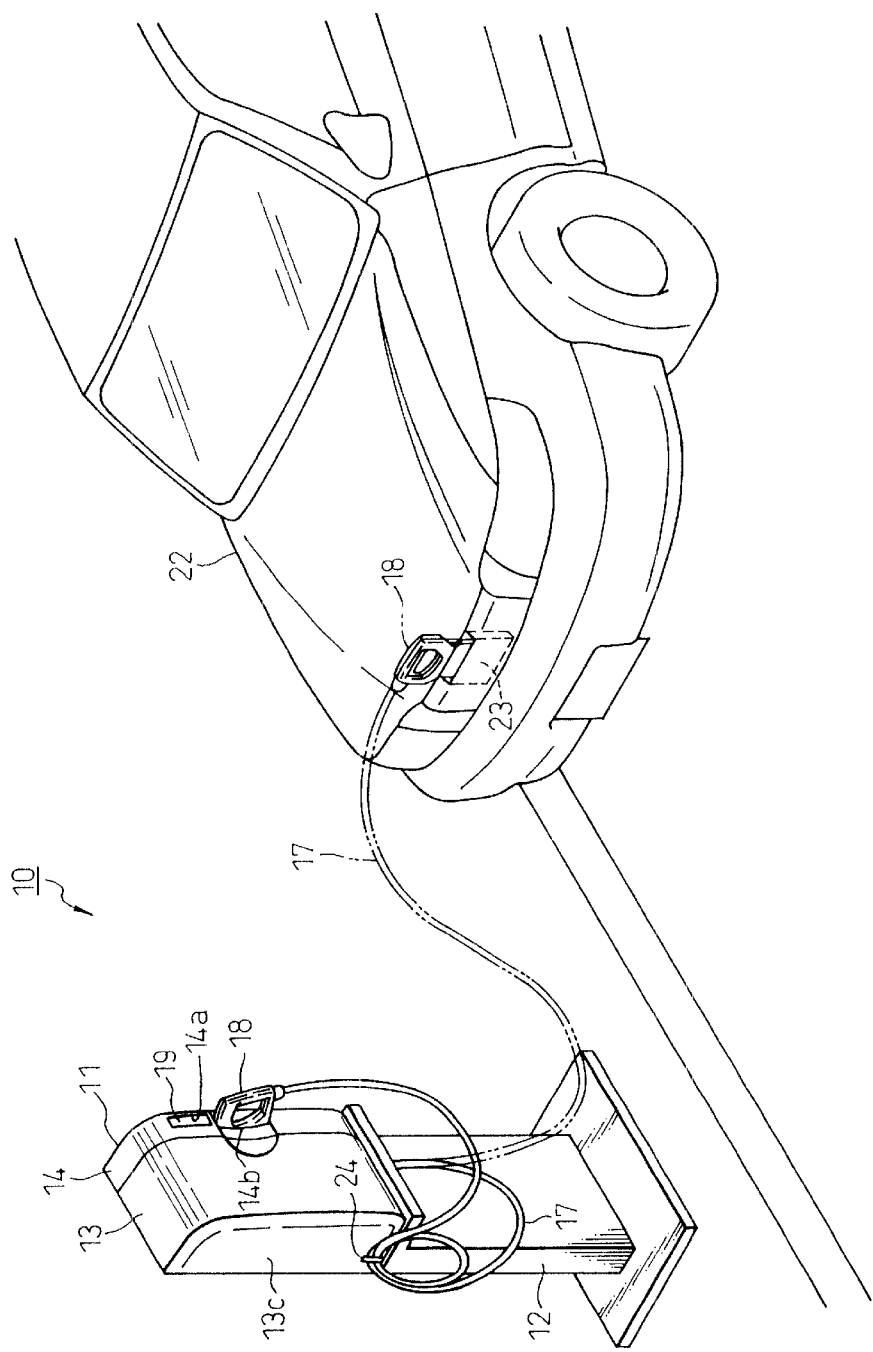
FIG. 1 is a perspective view of a charger which is used to charge an electric vehicle, according to the present invention.

The power supply paddle 18 is disposed on the power source apparatus 11 side when it is not used. Namely, the power supply paddle 18 is inserted in the opening 21 of the paddle holder casing 20 through the through hole 14b of the cover 14 and is received in the paddle holder casing 20, as can be seen in FIG. 1. In use, the power supply paddle 18 is removed from the paddle holder casing 20 and is connected to the receiving side charge port 23, as a power receiver on the electric vehicle 22, as indicated by a two-dotted and dashed line in FIG. 1.

As can be seen in FIGS. 1 through 3 and FIG. 5, a cable hook 24 in the form of a fishhook is secured to the side wall (left side wall in FIGS. 2 and 3) 13c of the housing 13 opposite the side wall 13b thereof. In the illustrated embodiment, the cable hook 24 is secured to the lower portion of the side wall 13c by screws 25. Namely, as shown in FIG. 5, the cable hook 24 is secured to the portion of the side wall 13c below an area D for the electric devices and a controller provided in the housing 13.

When the power supply paddle 18 is not used, i.e., is received in the paddle holder casing 20, the cable 17 extending from the power supply paddle 18 is hung from the cable hook 24.

The features of the charger 10 according to the illustrated embodiment will be discussed below.

(1) In the illustrated embodiment, the paddle holder casing 20 which receives and holds the power supply paddle 18 is obliquely provided on the right side wall 13b of the housing 13 so that the opening 21 of the paddle holder casing 20 is oriented slightly upwardly with respect to the horizontal direction.

Therefore, while the power supply paddle 18 is inserted in the opening 21 and is received and held in the paddle holder casing 20 when it is not used, the power supply paddle 18 cannot be easily detached or removed from the paddle holder casing 20, even if external force, such as tensile force is accidentally applied to the cable 17, and thus, the power supply paddle 18 can be certainly held in the paddle holder casing 20 without being dropped onto the ground.

(2) In the illustrated embodiment, the housing 13 of the power source apparatus 11 is provided with the cable hook 24 secured thereto. Consequently, as shown in FIG. 1, when the power supply paddle 18 is not used and is received and held in the paddle holder casing 20, the cable 17 extending from the power supply paddle 18 is hung from the cable hook 24. Consequently, the cable 17 is not in contact with the ground surface and accordingly is not rubbed over the ground surface and is not worn.

(3) In the illustrated embodiment, the output port 16 connected to the cable 17 is provided on the bottom surface 13a of the housing 14 adjacent to the cover 14, and the cable hook 24 is provided on the side wall 13c of the housing 13 opposite the side wall 13b on which the paddle holder casing 20 is provided. Consequently, when the power supply paddle 18 is received and held in the paddle holder casing 20 while the cable 17 extending from the output port 16 is hung from the cable hook 24, the cable 17 can be loosely held without being folded.

(4) Moreover, in the illustrated embodiment, the cable hook 24 is secured to the portion of the side wall 13c below the area D for the electric devices and the controller, arranged in the housing 13. Consequently, it is possible to secure the cable hook 24 to the housing 13 by the screws 25 without interfering with the electric devices and the controller, arranged in the housing 13. Furthermore, it is also possible to prevent water such as rainwater from entering the housing 13 along the threaded holes for the screws, thus resulting in short-circuit of the electric devices or the controller.

The illustrated embodiment can be modified as follows.

Although the above-mentioned embodiment is applied to a charger for an electric vehicle, the present invention can be applied to other vehicles. Moreover, the present invention can be applied to a charger which is not for use with a vehicle.

Although the cable hook 24 is secured to the side wall 13c of the housing 13 opposite the side wall 13b on which the power supply paddle 18 is provided, it is possible to provide the cable hook 24 on the front or rear wall of the housing 13 adjacent to the side wall 13b on which the power supply paddle 18 is provided.

In addition to the foregoing, the cable hook 24 is secured to the housing 13 by the screws 25 in the illustrated embodiment. Alternatively, it is possible to secure the cable hook 24 to the housing 13 by securing means other than the screws, e. g., welding, etc.

Although the cable hook 24 is secured to the lower portion of the side wall 13c of the housing 13 in the illustrated embodiment, it is possible to secure the cable hook 24 to an intermediate portion or an upper portion of the side wall 13c of the housing 13.

Moreover, the cable hook 24 may be of a shape other than a hook, e. g., in the form of an L-shape.

While the invention has been described by reference to specific embodiments chosen for purposes of illustration, it should be apparent that numerous modifications could be made thereto by those skilled in the art without departing from the basic concept and scope of the invention.

What is claimed is:

1. A charger in which a power supplier provided at one end of a cable continuously extending external from a power source apparatus installed on the ground is received and held in a paddle holder casing provided on the power source apparatus when the power supplier is not used, said power supplier being connected to a power receiver on a power receiving side in a noncontacting fashion to effect the charging by electromagnetic induction, wherein said paddle holder casing is obliquely arranged on one side wall of the power source apparatus.

2. A charger according to claim 1, wherein said power source apparatus is provided with a hook which can be engaged by the cable.

3. A charger according to claim 2, wherein said hook is provided on the other side wall of the power source apparatus that is located opposite the side wall thereof on which the paddle holder casing is provided.

4. A charger according to claim 2, wherein said hook is provided on a lower portion of the other side wall of the power source apparatus.

5. A charger according to claim 3, wherein said hook is provided on a lower portion of the other side wall of the power source apparatus.

6. A charger according to claim 1, wherein said power source apparatus comprises a cover including a hole therethrough, and wherein said paddle holding casing is continually accessible from outside said power source apparatus through said hole.

7. A charger in which a power supplier provided at one end of a cable extending from a power source apparatus installed on the ground is received and held in a paddle holder casing provided on the power source apparatus when the power supplier is not used, said power supplier being connected to a power receiver on a power receiving side in a noncontacting fashion to effect the charging by electromagnetic induction, wherein said power source apparatus is provided with a hook which can be engaged by the cable such that the weight of said cable is supported by said hook.

8. A charger according to claim 7, wherein said paddle holder casing is obliquely arranged on one side wall of the power source apparatus.

9. A charger according to claim 8, wherein said hook is provided on the other side wall of the power source apparatus that is located opposite the side wall thereof on which the paddle holding casing is provided.

10. A charger in which a power supplier provided at one end of a cable extending from a power source apparatus installed on the ground is received and held in a paddle holder casing provided on the power source apparatus when the power supplier is not used, said power supplier being connected to a power receiver on a power receiving side in a noncontacting fashion to effect the charging by electromagnetic induction, wherein said power source apparatus is provided with a hook which can be engaged by the cable, and wherein said hook is provided on the other side wall of the power source apparatus that is located opposite the side wall thereof on which the paddle holding casing is provided.

11. A charger according to claim 10, wherein said paddle holder casing is obliquely arranged on one side wall of the power source apparatus.

12. A charger according to claim 11, wherein said hook is provided on a lower portion of the other side wall of the power source apparatus.

* * * * *